United States Patent [19]

Replogle et al.

[11] 4,195,519

[45] Apr. 1, 1980

[54] MEASUREMENT OF WATER FLOW RATE

[75] Inventors: John A. Replogle, Tempe; Albert J. Clemmens, Mesa; Edward D. Bell, Tempe, all of Ariz.

[73] Assignee: The United States of America as represented by the Secretary of Agriculture, Washington, D.C.

[21] Appl. No.: 938,624

[22] Filed: Aug. 31, 1978

[51] Int. Cl.² .............................................. G01F 1/20
[52] U.S. Cl. ..................................................... 73/215
[58] Field of Search ........................................ 73/215

[56] References Cited

U.S. PATENT DOCUMENTS

| | | | |
|---|---|---|---|
| 1,271,901 | 7/1918 | Jay, Jr. | 73/215 |
| 1,372,138 | 3/1921 | Herschel | 73/215 |
| 3,124,000 | 3/1964 | Melas | 73/215 |
| 3,427,878 | 2/1969 | Gerlitz, Jr. et al. | 73/215 |
| 4,095,466 | 6/1978 | Schontzler | 73/215 |
| 4,127,032 | 11/1978 | Martig, Jr. | 73/215 |

OTHER PUBLICATIONS

Replogle, "Flow Meters for Water Resource Management", in Water Resources Bulletin, vol. 6, #3, pp. 345–374.
Hinde Eng. Co., Bulletin 1956.
Bos, "Discharge Measurement Structure", Pub. 161, Delft Hydraulics Lab., Netherland, 1976, pp. 121–154, 214–291.
Replogle, "Critical-Slow Flumes with Complex Cross Section", in Proceedings ASCE Irrigation & Drainage Div. Spec. Conf., 1975, pp. 366–388.
Replogle, "Selecting and Rating Meters for Open-Channel Flow", in Proceed. of Water Manag. for Irrigation and Drainage, 1977, pp. 305–319.
Replogle, "Portable Adjustable Flow-Measuring Flume for Small Canals", in Transactions of ASAE, vol. 20, #5, pp. 929–933, Sep. 10, 1977.

Primary Examiner—Herbert Goldstein
Attorney, Agent, or Firm—M. Howard Silverstein; David G. McConnell; Theodore J. Leitereg

[57] ABSTRACT

Water flow rate in channelized, flowing bodies of water is measured by first obstructing the flow of water in the body causing a rise in the water surface upstream from the obstruction. This rise in upstream water surface is communicated to a point above the obstruction and measured thereat. The measurement is then converted to a water flow rate. A device for measuring water flow rate includes means for producing an obstruction of water flow in the body of water thus causing a rise in the water surface upstream from the obstruction, means for communicating the rise in upstream water surface to a point above the obstruction, and means for measuring the rise at that point, all secured to a frame.

10 Claims, 3 Drawing Figures

MEASUREMENT OF WATER FLOW RATE

BACKGROUND OF THE INVENTION

1. Field of the Invention:

This invention relates to and has among its objects the provision of novel methods and apparatus for measuring water flow rate in channelized, flowing bodies of water, such as irrigation canals and the like. It is a particular object of the invention to provide a device that is portable. Further objects of the invention will be evident from the following description wherein parts and percentages are by weight unless otherwise specified.

2. Description of the Prior Art:

A number of approaches to the above-mentioned problem of measuring water flow rate have been contemplated and put into practice. For example, flumes and weirs of various types, depending on their configuration, have been employed. A flume is essentially a small dam or a side wall contraction in a ditch which raises the upstream water level causing conditions suitable for measurement. Presently in use are the Parshall flume, the cutthroat flume, and long-throated flumes. It has been generally accepted that large head (energy expressed in terms of water depth) loss must accompany the use of flumes, and to overcome this disadvantage complex designs were conceived which made the installation of flumes time-consuming and costly. To date, portable flumes have been difficult to move and install; thus, flumes are usually permanently cited.

A weir is a notch of regular form through which water flows, or a structure containing such a notch. A weir with a sharp upstream corner or edge causing the flowing water to spring clear of the crest is called a sharp-crested weir, which may be used for measuring water flow rate. Other types of weirs, classed as weirs not sharp-crested are a variation of the flume described above. As with flumes, weirs usually require permanent installation. Furthermore, they frequently cause so much flow obstruction in the canal that the canal cannot function properly. Large head loss occurs because the top crest of the weir must be higher than the downstream water surface to cause a reliable spillover relationship suitable for accurate flow determination.

Flumes and weirs of various types are discussed in the following publications incorporated herein by reference: (1) Horace W. King, "Handbook of Hydraulics," McGraw-Hill Book Company, Inc., New York, pages 81–150 (1939); (2) M. G. Bos, ed., *Discharge Measurement Structures,* Publication No. 161, Delft Hydraulics Laboratory, Delft, The Netherlands, pages 121–154 and 214–291 (1976); (3) John A. Replogle, *Proceedings of the ASCE Irrigation and Drainage Division Specialty Conference,* Logan, Utah, pages 366–388 (1975); (4) John A. Replogle, *Proceedings of Water Management for Irrigation and Drainage ASCE,* Reno, Nevado, pages 305–319 (1977). Furthermore, a device in accordance with the present invention is described by Replogle in the *Transactions of the ASAE,* Vol. 20, No. 5, pages 928–933 (September–October 1977), also incorporated herein by reference.

Although flumes and weirs for the most part require permanent installation, measurement of water flow rate has been accomplished with portable devices, such as propeller-type current meters, electromagnetic velocity probes, pilot tubes, and other related velocity detectors, and the like. Such apparatus are described by Replogle in the *Water Resources Bulletin,* Vol. 6, No. 3, pages 345–374 and in "Instrumentation and Measurement for Environmental Sciences," pages 5-01 to 5-20, published by the American Society of Agricultural Engineers, St. Joseph, Michigan (1975). Rate determinations require detailed observations and additional data, thus rendering the use of the aforementioned devices slow and costly. In addition, the accuracy obtained with the above devices is only about ±5%.

A portable version of a Palmer Bowlus flume (E. A. Wells and H. B. Gotaas, *Journal of Sanitary Engineering,* Proceedings of the American Society of Civil Engineers, pages 928-1 to 928-37 (1956)) is commercially available (Hinde Engineering Co., Saratoga, California). The known apparatus employs conventional measurement techniques and, thus, suffers from much the same disadvantages as permanent flumes.

SUMMARY OF THE INVENTION

We have developed a method and apparatus for measuring water flow rate in channelized, flowing bodies of water such as irrigation canals. In our method an obstruction of the water flow is produced, thus causing a rise in the water surface upstream from the obstruction. This rise in the upstream water level is communicated to a point above the obstruction and measured at that point. The rise in the upstream water level can be quickly converted to flow rate with reference to known tables as listed hereinbelow or to tables generated in the laboratory according to conventional methods.

An apparatus in accordance with our invention includes a frame with means for producing an obstruction of the water flow in the body of water thus causing a rise in the water surface upstream from the obstruction attached thereto. Further secured to the frame is means for communicating the rise in the upstream water surface to a point above the obstruction and means for measuring the rise at that point.

A particular device in accordance with the above principles is an apparatus wherein the means for producing an obstruction in water flow comprises a sill attached to a frame with a transition surface in the form of a ramp attached to the sill at its upstream edge. A small stilling well is positioned above the sill at a point on the flume centerline about ⅜ to ¾ the length of the sill from the upstream edge of the sill. The stilling well communicates with a retractable pipe, for sensing the rise in upstream water surface, at the bottom of the apparatus of the invention by means of flexible tubing. A point gage for determining the rise in upstream water surface is attached to the frame over the sill. Leakage past the ramp is controlled by strips of flexible material attached to the sides and bottom of the ramp.

The primary advantage of the method and apparatus of the invention is that quick and accurate measurements of water flow rates can be obtained. Such measurements can routinely be made in 3 to 4 minutes including implacement time of a portable device in accordance with out invention. Furthermore, the instant device is accurate to within ±2% whereas known portable devices are less accurate and require lengthy implacement procedures.

A further advantage of the invention is that precise placement and leveling of the apparatus, as required for other measuring devices, is not necessary. Communicating the rise in upstream water surface to a point above the obstruction by placing the stilling well and point gage over the sill in our apparatus makes it insensitive to problems of leveling in all directions.

Another advantage of the invention is that only an obstruction of flow, e.g., by side wall contraction or by canal bottom contraction such as that produced by a sill and ramp combination, are required. Other parts, necessary in known flumes and weirs, are obtained from the existing irrigation canal in our method. This is in sharp contrast to the known flumes and weirs which customarily have several sections and numerous finished surfaces. Thus, the instant device is much smaller and lighter weight than the apparatus of the prior art.

Another advantage of the invention is that very little head loss is realized. As pointed out above, the use of known methods and apparatus, especially flumes and weirs, is accompanied by large head loss. The head is the depth of water associated with discharge which must be created and measured to determine water flow rate. Our unique device produces little head loss while requiring the minimum in design features thus keeping operation and use simple and facile and the cost thereof low.

DESCRIPTION OF THE PREFERRED EMBODIMENTS

Figure 1:
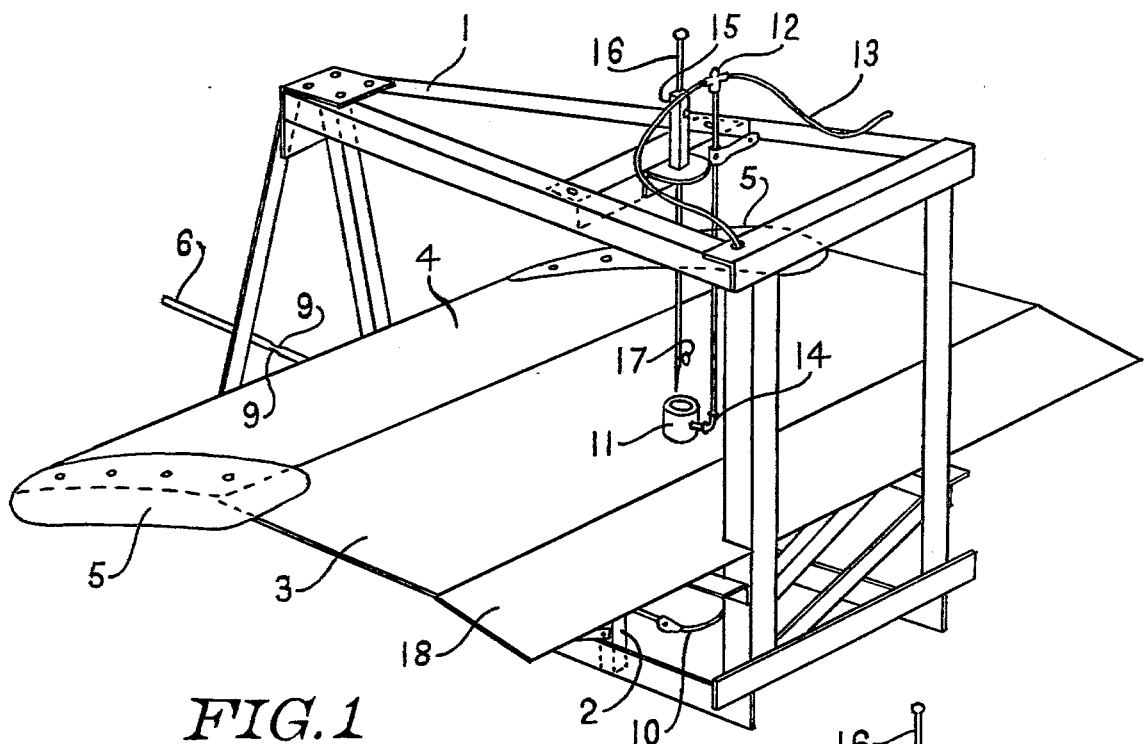
FIG. 1 is a prospective view of the apparatus of the invention from a point above the downstream face of the apparatus.

In the following description attention is directed by means of FIGS. 1 and 2 to a portable device adapted to fit a standard slip-formed irrigation canal. This direction is by way of example only and is not meant as a limitation. In its broad ambit the apparatus of the invention can be designed with minor alterations from that depicted in the drawings for use in irrigation canals and other channelized, flowing bodies of water of all types and shapes. Armed with the principles of our method outlined in this disclosure one skilled in the art can readily construct a device in accordance with the invention suitable for any canal in which water flow measurements are desired.

Figure 2:
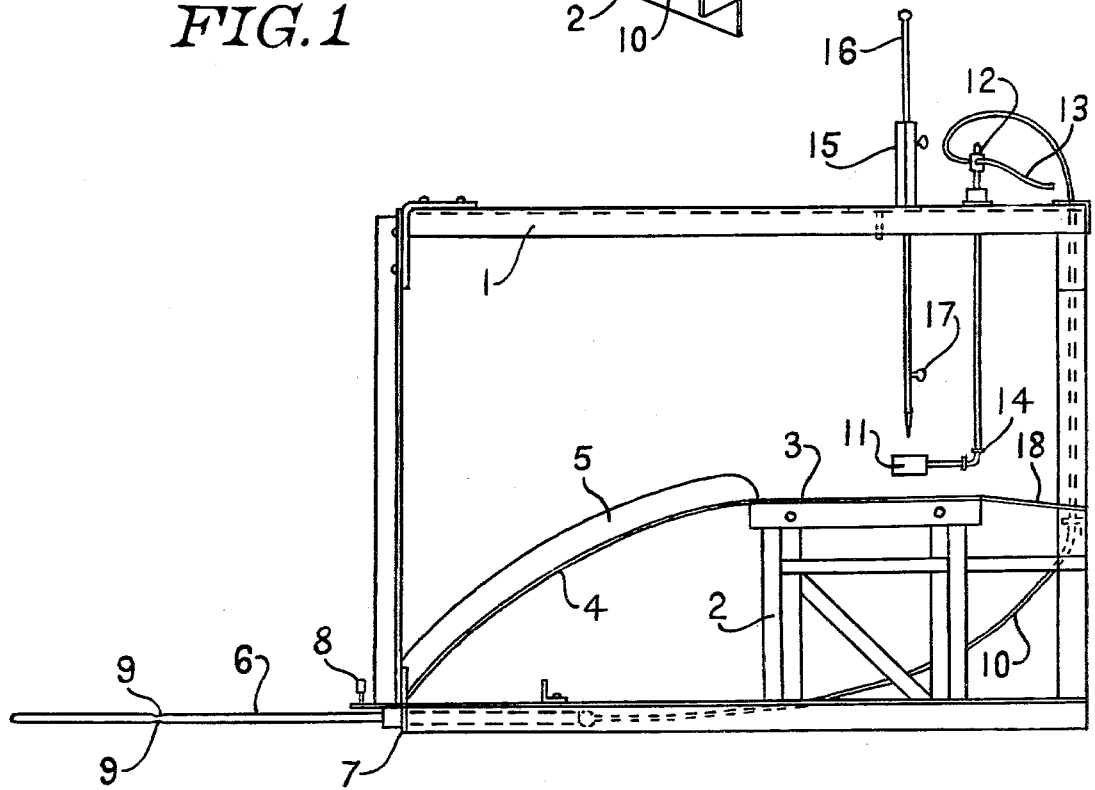
FIG. 2 is a side plan view of the apparatus of the invention.

Referring now to FIGS. 1 and 2, attached to frame 1 through subframe 2 is sill 3 with dimensions determined according to the following rules: The sill must be high enough so that the flume will not be affected by too much back-water from downstream and low enough so that water will not flow over the canal walls at maximum flow rate; generally the height of the sill will be 30–60% of the depth of the canal as determined by engineering hydraulic design. The length of the sill is about 1.5 to 20 times the depth of the flow above the sill. The width of the sill is commensurate with the width of the canal at the particular sill height employed. Sill 3 may be fabricated from metal, wood, plastic, fiberglass, etc., or any material compatible with submergence in water and the weight requirements of the instant device. Subframe 2 provides support for sill 3 and may be made of metal, wood, plastic, and the like, as may also frame 1. Ramp 4 likewise may be metal, wood, plastic, etc., and is attached along the width of 3 at its upstream edge. The dimensions of 4 are not critical although the ramp must conform to the shape of the canal. The important feature of the ramp is that it slopes (either straight-line or curved) from the height of sill 3 in an upstream direction to the bottom of the canal; the slope should be about 3:1 but again this is not critical as long as some slope is present. It should be obvious then that the width of 4 at its downstream edge will be the width of the canal bottom and ramp 4 will be tapered thusly. Along the sides and upstream edge of 4 are attached seals 5 made of flexible material such as rubber, etc. Generally, seals 5 are about 8–12 cm wide, that is, wide enough to prevent leakage of water around and under the ramp. Seals 5 are especially effective when shaped such that the pressure of the flowing water causes an effective seal along the canal walls and floor. It must be cautioned that seals 5 should never be allowed to turn under the ramp during placement of our apparatus; if such a situation occurred, the effectiveness of the seal would be greatly reduced.

Retractable sensing pipe 6 is attached to 1 by means of holder 7, with set screw 8, along the bottom of 1 approximately in the center of the apparatus. At its upstream end pipe 6 is capped or otherwise closed and pressure sensing holes 9 are placed around 6 at a distance upstream from the main structure at holder 7 sufficient to accurately sense the increased pressure due to the rise in the upstream water level produced by sill 3; in general, this distance is about 30.5 cm±2.5 cm. It should be emphasized, however, that this distance can be about 15–50 cm with the proviso that the computation of discharge rate referred to herein below be adjusted accordingly. The diameter of 6 is usually about 2 to 3 cm.

One end of flexible tubing 10 is connected to the downstream end of 6; the other end of 10 is connected to stilling well 11 positioned above sill 3. The flexible tube (10) is branched at point 12 to provide siphon priming point 13; 12 takes the form of a three-way valve or the like. The diameter of 10 should be appropriate to quickly and accurately convey the pressure increase sensed by 6, usually about 4 to 6 mm in diameter.

Well 11 is a small version of a stilling well, that is, a device for reducing pressure fluctuations of the flow. Generally, well 11 is about 3 to 10 cm in diameter and 3 to 5 cm deep and is rotatable at pivot point 14.

Point gage holder 15 is mounted rigidly on 1 above sill 3 at or near the centerline of the apparatus and at a point about ⅛ to ¼ the length of the sill from the downstream edge of sill 3. Gage 16 is slidably mounted in 15 so that it can be raised or lowered and set screw 17 is provided to restrict the movement of 16 within 15. Stilling well 11 pivots at point 14 and can be positioned immediately below gage 16.

In an alternate embodiment of the invention, head recovery outlet 18 may be attached to frame 1 and the downstream edge of sill 3. The function of 18 is to increase the tolerance of the device so that it can withstand more downstream water depth. The increase is from about 85% backwater submergence to 95% submergence without affecting the function of the device.

Figure 3:
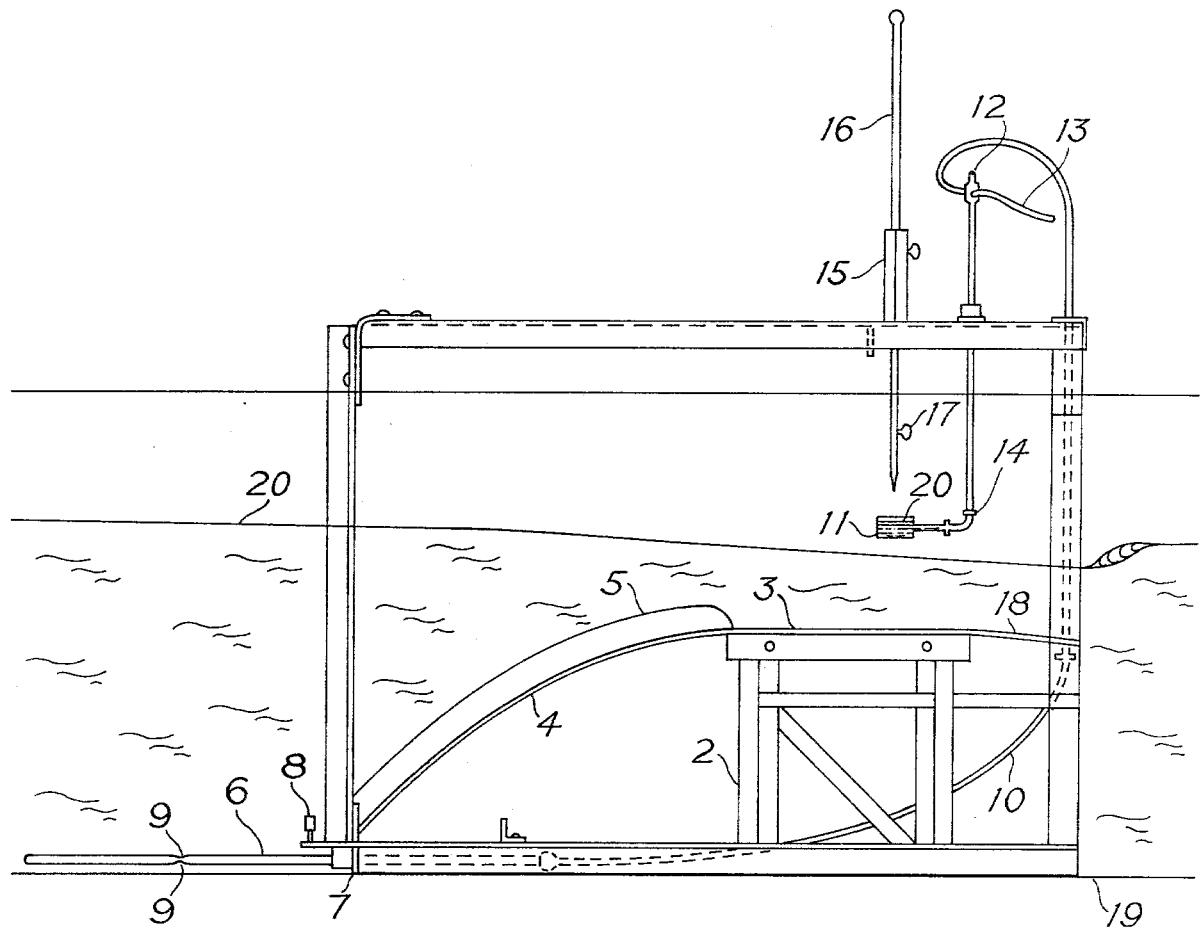
FIG. 3 is a side plan view of the apparatus of the invention in a channel containing water.

The operation of the instant apparatus is described next with reference to the attached drawings (FIGS. 1–3). In practice, sensing pipe 6 is extended to a distance of about 60 to 70 cm from the upstream edge of the apparatus and locked into place by means of set screw 8. Next, the point gage 16 is lowered to the top of the sill 3 to obtain a zero point reading. The apparatus is placed into a flowing stream of water with the sensing pipe 6 directed upstream. Placement of our device can be made, for example, by sliding the apparatus down the canal wall or lowering the apparatus from the top center of the canal (19). It should be noted that the portable device of the invention weighs about 10 to 15 kg and can be easily handled for implacement in the canal. The position of seals 5 should be checked to ensure that a proper seal to prevent leakage of water around and under ramp 4 is obtained.

Following the implacement operation, air is purged from holes 9, pipe 6, and tubing 10 by means of siphon priming tube 13. Valve 12 is closed to tube 13 and water flow is allowed to communicate with and to stabilize in well 11, usually for about 2-4 minutes. Point gage 16 is raised and stilling well 11 is positioned therebelow. Gage 16 is lowered to the level of the water in 11, which represents the level of water upstream (20) from the apparatus above pipe 6. The difference in the two readings, i.e., zero point and water level in 11 can be quickly converted to discharge flow rate by reference to precomputed tables generated by laboratory calibration or by use of established computer modeling techniques described by Replogle in the above-cited references. Following the above measurement the apparatus is removed from the canal by lifting the upstream end of frame 1.

Hereinabove, a portable apparatus in accordance with the instant invention has been described. It should be emphasized that permanent installations of devices satisfying the principles of our invention may be made. Such devices are capable of installation much more quickly, easily, and inexpensively than those known in the art. Generally, devices for permanent installation are constructed of concrete or the like, but other materials can be employed. The permanent devices of the invention are characterized by the fact that they display excellent precision with one accurately finished surface, usually concrete. The known apparatus require up to twelve surfaces that must be accurately finished. On permanent versions of our devices, standard stilling wells and surveying techniques are used to set the proper zero reference to the sill top.

Having described our invention, we claim:

1. A method for measuring rate of water flow in channelized, flowing bodies of water, which comprises—
   (a) obstructing the flow of water in said body to produce a rise in the water surface upstream from the obstruction,
   (b) communicating the rise in said upstream water surface to a point above the obstruction,
   (c) measuring at a point above the obstruction the rise in said upstream water surface, said measurement representing the difference between the level of said upstream water surface after obstruction and the top of the obstruction, and
   (d) converting said measurement of the rise in upstream water surface to the rate of water flow in said body of water.

2. An apparatus for measuring rate of water flow in channelized, flowing bodies of water, which comprises—
   (a) a frame,
   (b) means for producing an obstruction in the water flow in said body of water thus causing a rise in the water surface upstream from the obstruction attached to said frame,
   (c) means for communicating the rise in the upstream water surface to a point above the obstruction attached to said frame, and
   (d) means attached to said frame at a point above the obstruction for measuring the rise in said upstream water surface, said measurement representing the difference between the level of said upstream water surface after obstruction and the top of the obstruction.

3. The apparatus of claim 2 wherein said means for producing an obstruction in water flow comprises bottom wall contraction.

4. The apparatus of claim 3 wherein said bottom wall contraction comprises a floor sill.

5. The apparatus of claim 4 wherein said bottom wall contraction further comprises a ramp attached to the upstream edge of said sill.

6. The apparatus of claim 5 wherein said ramp further includes flexible seals along its sides and upstream edge to prevent leakage of water around said ramp.

7. The apparatus of claim 2 wherein said means for producing an obstruction in water flow comprises side wall contraction.

8. The apparatus of claim 2 wherein said means for communicating the rise in upstream water surface to a point above the obstruction comprises a retractable pipe for sensing the rise in upstream water surface cooperating with a stilling well.

9. The apparatus of claim 2 wherein said means for measuring the rise in upstream water surface comprises a point gage cooperating with the top of the obstruction and with a stilling well in communication with a retractable pipe for sensing the rise in upstream water surface.

10. An apparatus for measuring rate of water flow in channelized, flowing bodies of water, which comprises—
    (a) a frame,
    (b) means for producing an obstruction in the water flow in said body of water thus causing a rise in the water surface upstream from the obstruction attached to said frame,
    (c) means attached to said frame for communicating the rise in the upstream water surface to a point above the obstruction, which includes a retractable pipe for sensing the rise in upstream water surface cooperating with a stilling well,
    (d) means attached to said frame at a point above the obstruction for measuring the rise in said upstream water surface, said measurement representing the difference between the level of said upstream water surface after obstruction and the top of the obstruction, which includes a point gage cooperating with the top of the obstruction and with the stilling well.

* * * * *